United States Patent [19]
Kitsuregawa et al.

[11] Patent Number: 5,237,683
[45] Date of Patent: Aug. 17, 1993

[54] METHOD AND APPARATUS FOR DATA DISTRIBUTION

[75] Inventors: Masaru Kitsuregawa, 17, Maruyama-cho, Nijusekigaoka, Matsudo-shi, Chiba-ken; Shinya Fushimi, Kanagawa, both of Japan

[73] Assignees: Masaru Kitsuregawa; Mitsubishi Denki Kabushiki Kaisha, both of Japan

[21] Appl. No.: 591,700

[22] Filed: Oct. 2, 1990

[30] Foreign Application Priority Data

Nov. 6, 1989 [JP] Japan .................................. 1-288465

[51] Int. Cl.$^5$ .............................................. G06F 13/38
[52] U.S. Cl. ............................ 395/650; 364/DIG. 2; 364/928.1; 364/942.7; 395/325
[58] Field of Search ........................ 395/650, 275, 325; 364/DIG. 1, DIG. 2

[56] References Cited

U.S. PATENT DOCUMENTS 3,732,548  5/1973  Howells et al. ............... 364/DIG. 2
4,482,996  11/1984  Wilson et al. .
4,621,359  11/1986  McMillen .

FOREIGN PATENT DOCUMENTS 61-83392  6/1986  Japan .
62-21398  1/1987  Japan .
62-54350  3/1987  Japan .
8602511  4/1986  World Int. Prop. O. .

OTHER PUBLICATIONS

Sakai et al., "Interconnection Network for Bucket Distribution on Relational Algebra Machine".
Patent Abstracts of Japan, vol.11, No. 62, Feb. 25, 1982, "Parallel Logic Simulation Device".
Ahmadi et al, "A High-Performance Switch Fabric for Integrated Circuit and Packet Switching", IEEE Proceedings of the Conf. on Computer Comm., Infocom. vol. Conf. 7, Mar. 27-31, 1988 pp. 9-18.
Kitsuregawa et al, "Architecture and Performance of Relational Algebra Machine Grace", Proc. of Inter. Conf. on Parallel Processing, 1984, pp. 241-250.

Primary Examiner—Thomas M. Heckler
Attorney, Agent, or Firm—Wolf, Greenfield & Sacks

[57] ABSTRACT

A data distributing method and an apparatus employing such method are disclosed, wherein a counter group counts and stores a cumulative number of data or work units outputted from a coupling unit for each kind of data. A control circuit recognizes the kind of data that is inputted to each of two input lines of the coupling unit, judges whether or not there is a deviation of distribution of data or work units which are transferred from a first group of devices to a second group of devices on the basis of the counts of the counters that correspond to the kinds of data recognized, and changes over connection patterns of switch in the coupling unit so that any deviation is corrected thereby equally distributing data or work units to the second group of devices.

4 Claims, 5 Drawing Sheets

CHANGE-OVER SIGNAL
FROM CONTROLLER

Fig. 6 (PRIOR ART)

METHOD AND APPARATUS FOR DATA DISTRIBUTION

BACKGROUND OF THE INVENTION

The present invention relates to a method of and apparatus for data distribution wherein a large amount of data or work units are equally distributed among a plurality of memories which constitute a memory group, thereby enabling parallel processing of a large amount of data or work units.

Figure 5:
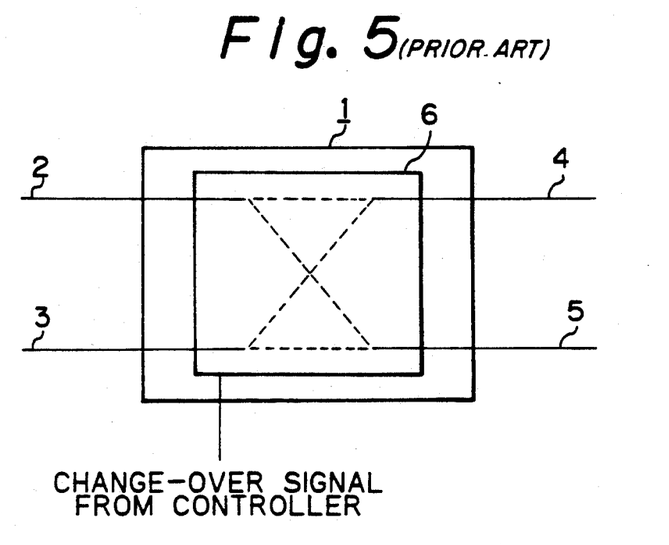
FIG. 5 is a block diagram of a coupling unit which is employed in the conventional data distributing apparatus.

FIG. 5 shows a coupling unit that is employed in a conventional data distributing apparatus, which is disclosed, for example, in Electronic Communication Society Proceedings Vol. J86-D, No. 6, p. 1272.

Referring to FIG. 5, reference numeral 1 denotes a coupling unit; 2 and 3, two data input lines of the coupling unit 1; 4 and 5, two data output lines of the coupling unit 1; and 6, a switch which realizes either one of the two connection patterns, that is, a first pattern in which the input lines 2 and 3 are connected to the output lines 4 and 5, respectively, (hereinafter referred to as "parallel pattern"), and a second pattern in which the input lines 2 and 3 are connected to the output lines 5 and 4, respectively, (hereinafter referred to as "cross pattern"), in response to a data connection pattern change-over signal that is delivered from a controller (denoted by reference numeral 10 in FIG. 4).

Figure 6:
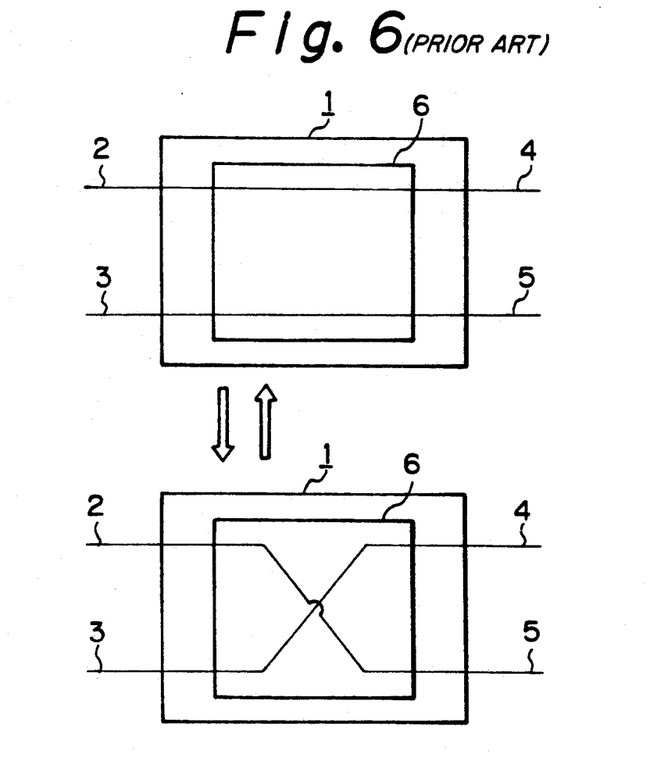
FIG. 6 is a block diagram showing switch connection patterns in a coupling unit.

FIG. 6 shows the two data connection patterns that are alternatively realized by the switch 6 inside the coupling unit 1. FIG. 4 shows the general arrangement of a typical conventional data distributing apparatus. Reference numeral 7 in FIG. 4 denotes a data distributing apparatus, 8 a first memory group, 9 a second memory group, and 10 a controller that controls data distribution.

Figure 4:
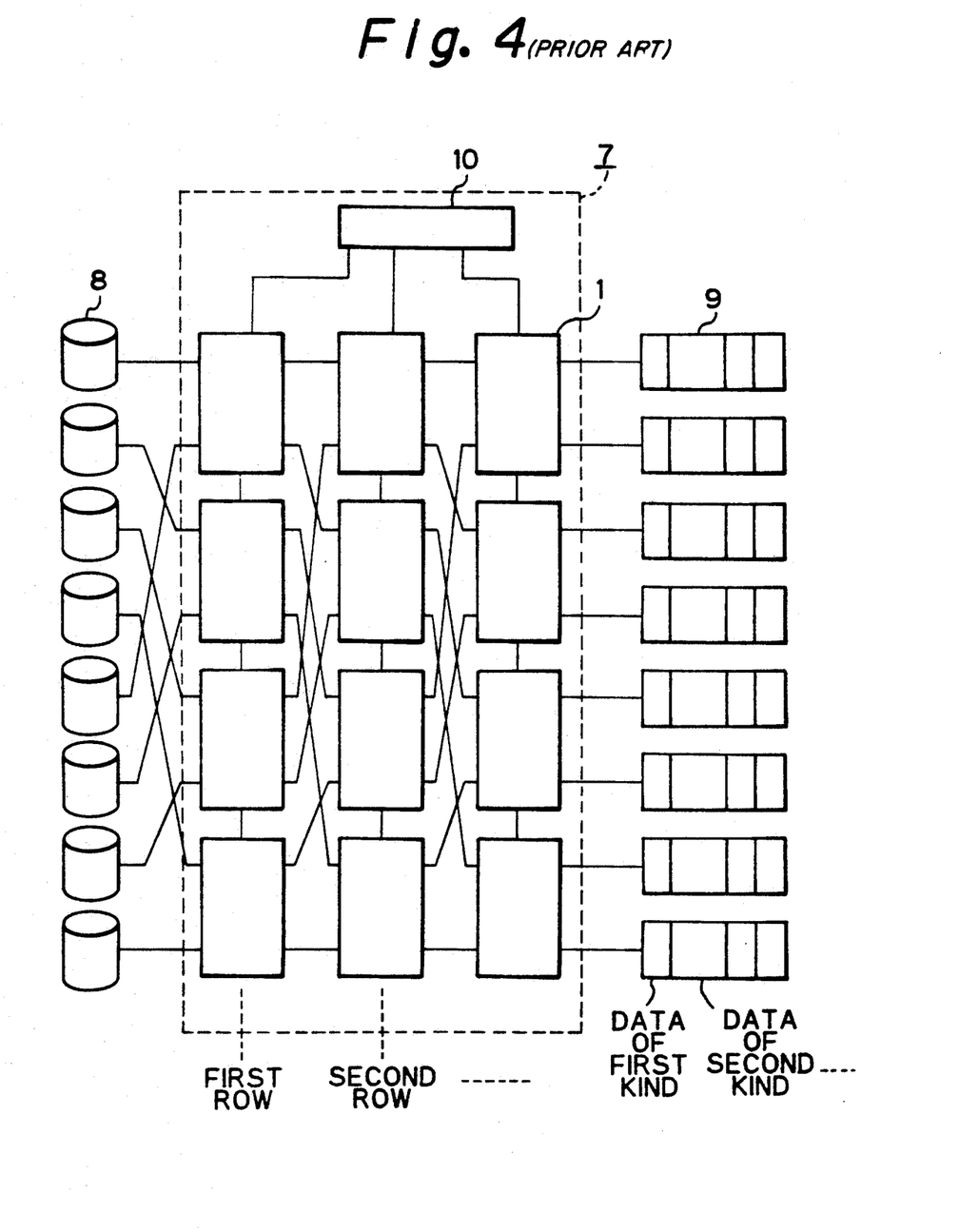
FIG. 4 is a general block diagram of a conventional data distributing apparatus.

In the system shown in FIG. 4, coupling units 1 are arranged in a matrix comprising 4×3 rows. This is because the first memory group 8 comprises 8 memories and it is therefore necessary to provide 4 units (each having two input lines) in each vertical row and $\log_2 8 = 3$ rows in each horizontal row. Generally, it is necessary in order to distribute data equally by use of a first group of N memories and a second group of N memories to form a data distributing apparatus comprising a group of coupling units which are arranged in a matrix of $(N/2) \times \log_2 N$ rows. It should be noted that there are various other methods of arranging a network which comprises a plurality of coupling units and that the technique according to the present invention may be similarly effectively applied to these methods. The details of the coupling unit arrangement shown in FIG. 4 and other coupling unit arrangements are explained in the report of the above-mentioned Electronic Communication Society Proceedings.

The first memory group 8 stores at least data which is to be processed. The second memory group 9 is used as a temporary memory area for processing data stored in the first memory group 8. A plurality of coupling units 1 are adapted to equally distribute the data in the first memory group 8 to the second memory group 9 according to a predetermined rule.

An example operation will next be explained. For the sake of the description, it is assumed that the object of distribution is data only and data is transferred from the first group 8 of N memories to the second group 9 of N memories after being classified into K different kinds of data. The object of the data distributing apparatus is to equally distribute data stored in the first memory group 8 to the second group 9 of N memories for each kind of data. More specifically, each piece of data belongs to one of the K different kinds of data, i.e., from 0 to $K-1$. It is assumed that the total number of data of the X-th ($X=0, \ldots, K-1$) kind is $N_X$ and the $N_X$ of data is transferred from the first memory group 8 to the second memory group 9. In such a case, the object of the data distributing apparatus is to realize a condition in which each of the memories in the second memory group 9 has $N_X/K$ of data stored therein upon the completion of the data transfer, for all the X ($X=0, \ldots, K-1$) kinds of data.

As the data distribution operation is started, data is successively sent from the first group of memories 8 to either the input lines 2 or 3 of the coupling units 1 in the first row, which are connected with the first memory group 8. Each coupling unit 1 in the first row sets either one of the two patterns for the switch 6 shown in FIG. 6 according to an instruction from the data distribution controller 10 to move the input data in accordance with the set pattern, thereby transferring the data to one of the coupling units 1 in the second row which is connected to the coupling unit 1 concerned, through either the output line 4 or 5. The coupling units 1 in the second row and those in the rows following repeat a similar operation. Data that is outputted through either the output line 4 or 5 of each coupling unit 1 which belongs to the final row is stored in the corresponding memory in the second memory group 9 while being arranged according to kind.

The data distribution controller 10 holds administrative information that indicates the number of data of each kind which have been distributed to each memory in the second memory group 9, thereby controlling the equal distribution of data at all times. Accordingly, assuming that the kind of data sent from the first memory group 8 is represented by X, the controller 10 selects from amoung the memories in the second memory group 9 one to which data of the kind X have been least distributed up to now, and controls the connection of the coupling units 1 so that the relevant data is transferred to the selected memory in the second group 9, thereby eventually providing equal distribution of data for each kind.

In the conventional data distributing apparatus stated above, the data distribution controller 10 needs to determine a connection pattern for the switches 6 of all the coupling units 1 for every data transfer operation during the data distribution and to inform the coupling units 1 of the determined patterns, and this remarkably lowers the efficiency of the data distribution processing. Another problem of the prior art apparatus is that, as the number of memories in the first and second groups and the number of coupling units increase, the load of distribution control concentrates on the data distribution controller 10, so that the processing performance is likely to substantially deteriorate. In the distribution of work units also, the prior art apparatus stated above suffers from the same problems.

In view of the above-described problems of the prior art, it is an object of the present invention to provide a data distributing method which enables an improvement in the efficiency of the data or work unit distribution processing and which is free from the problem of deterioration in the performance of data or work unit distribution processing even when the number of memories in the first and second groups and the number of coupling units increase, and also provide a data distributing apparatus which is effectively employed to carry out the data distributing method.

Figure 3:
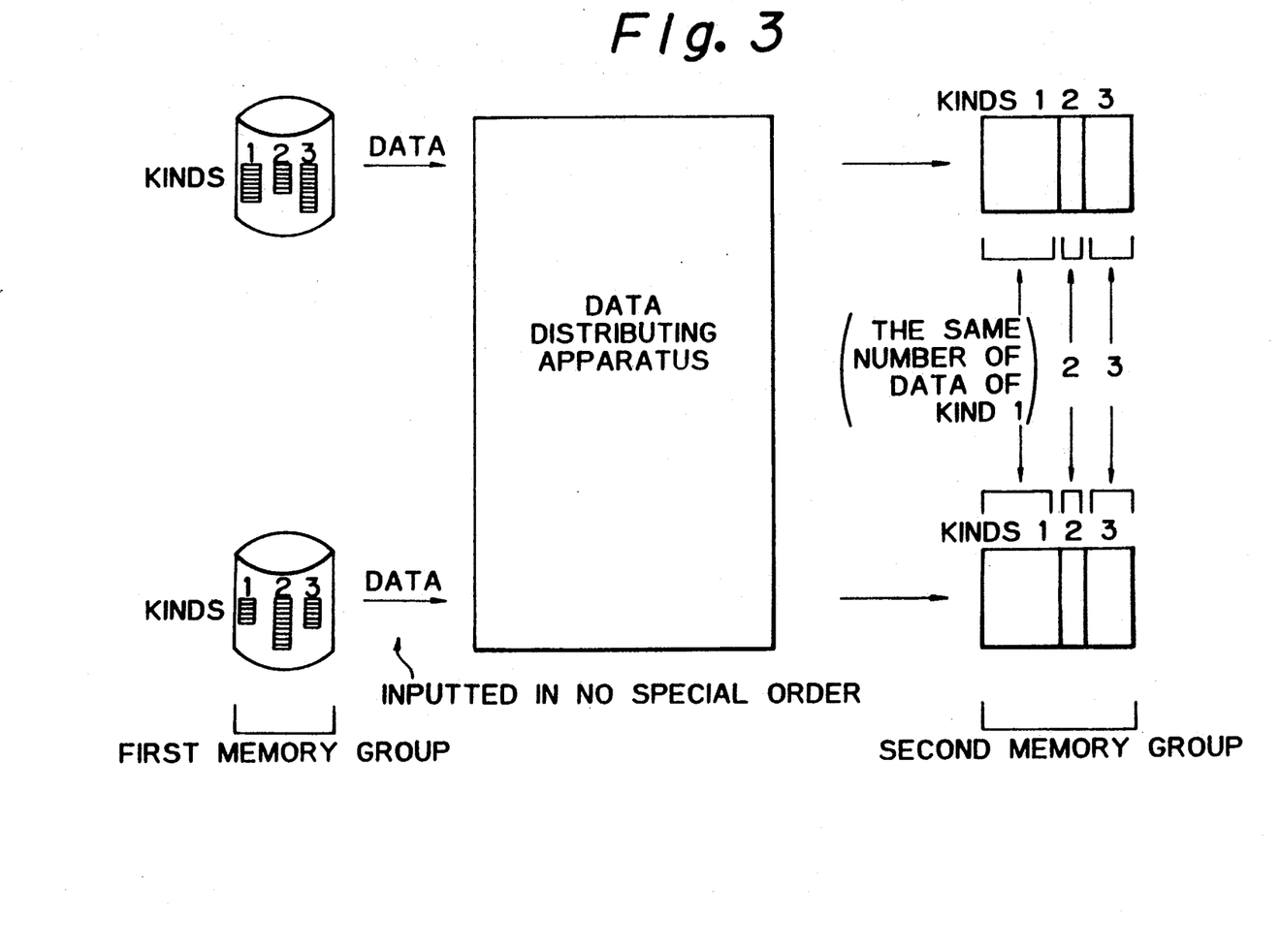
FIG. 3 is a block diagram showing the concept of the present invention to explain differences between the present invention and related prior arts.

The following sentences are given for references:
(1) The present invention is a data distributing method which is designed so that data (or work units) which is classified into a plurality of kinds is distributed equally for each kind, as shown in FIG. 3. In addition, the present invention provides an apparatus for this data distributing method. More specifically, in a data base processing operation (e.g., a retrieval processing of a large amount of data), data in a first group of memories is classified into a plurality of kinds and then equally distributed to a second group of memories for each kind [this feature will be hereinafter referred to as (A)], thereby enabling high-speed parallel processing by a plurality of processors which are provided separately.
(2) The data distributing apparatus according to the present invention comprises a plurality of coupling units, which transfer a plurality of input data to a plurality of output destinations by changing over data connection patterns of respective internal switches. More specifically, each coupling unit is provided with a group of counters for counting and storing a cumulative number of data for each kind of data, and the connection pattern change-over control is effected on the basis of the counts of these counters, thus determining an output destination for each piece of input data. In other words, each coupling unit individually determines an output destination of each piece of input data by use of the counts of its own counters [this feature will be hereinafter referred to as (B)]. By doing so, the equal distribution of data for each kind, which is stated in the above paragraph (1), can be made efficiently. In the present invention, each piece of data may be sent to any desired memory, and it is only desired to achieve equal distribution of data for each kind [this feature will be hereinafter referred to as (C)].

Accordingly, a prior art wherein each piece of data is given the address of a device of final transfer destination, which is disclosed, for example, in Japanese Patent Public Disclosure (KOKAI) No. 62-54350 (1987), is different from the present invention in the object with regard to the above feature (A). Regarding the above feature (C), the prior art is different from the present invention in premised scope. In the prior art, control information that is required to switch the coupling units is obtained from an address that is given to each piece of data to be transferred, which is different from the above feature (B). In addition, the applicable field of the prior art is confined to data communication.

A prior art that is disclosed in Japanese Patent Public Disclosure (KOKAI) No. 62-21398 (1987) is adapted for data communication, which is a different field from data base processing. The object of this prior art is different from that of the present invention with regard to the above features (A) and (C). In addition, control data that is employed to switch the coupling units is given as a part of data, which is also different from the above feature (B).

Further, a prior art that is disclosed in Japanese Utility Model Public Disclosure (KOKAI) No. 61-83392 (1986) is different from the present invention in that it is adapted to handle image signals. In this prior art, the transfer of a single input to a multiplicity of outputs is controlled with a single gate, which is different from the data transfer carried out in the present invention in which a plurality of inputs are transferred to a plurality of outputs through a multiplicity of coupling units. Although this prior art is the same as the present invention in that a counter is employed for distribution of data, the counter in the prior art is not adapted to execute counting with regard to the kind of data and the object of this prior art is not the equal distribution of data.

SUMMARY OF THE INVENTION

In the data distributing apparatus according to the present invention, each coupling unit is provided with a group of counters which correspond respectively to a plurality of kinds of data or work units, and a control circuit which controls the counter group and also controls the change-over of connection patterns of a data switch on the basis of the contents of the counter group. The counter group counts and stores a cumulative number of data or work units outputted from the coupling unit for each kind of data, and the control circuit judges whether or not there is a deviation of the distribution of data or work units which are transferred from a first group of devices (the first memory group) to a second group of devices (the second memory group) on the basis of the contents of the counter group and changes over the connection patterns of the data switch in the coupling unit so that the deviation is corrected, if any, thereby equally distributing data or work units to the second group of devices.

In the data distributing method according to the present invention, the counter group counts and stores a cumulative number of data or work units outputted from the coupling unit for each kind of data. The control circuit recognizes the kind of data that is inputted to each of the two input lines of the coupling unit, judges whether or not there is a deviation of the distribution of data or work units which are transferred from a first group of devices (the first memory group) to a second group of devices (the second memory group) on the basis of the counts of the counters that correspond to the kinds of data recognized, and changes over the connection patterns of the data switch in the coupling unit so that any deviation is corrected thereby equally distributing data or work units to the second group of devices.

DETAILED DESCRIPTION OF THE PREFERRED EMBODIMENTS

Figure 1:
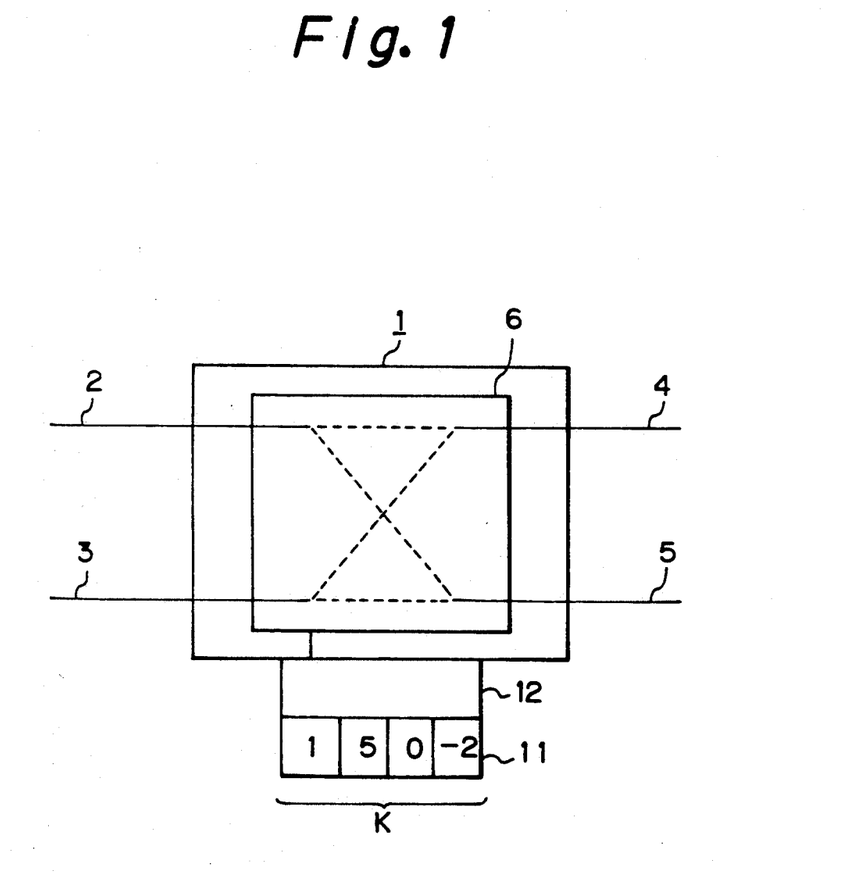
FIG. 1 is a block diagram of a coupling unit which is employed in one embodiment of the data distributing apparatus according to the present invention.

FIG. 1 is a block diagram showing a coupling unit that is employed in one embodiment of the data distributing apparatus according to the present invention. In this embodiment, the present invention is explained with regard to the distribution of data. Referring to FIG. 1, reference numeral 1 denotes one coupling unit 1 for equally distributing data from a first group of memories (a first group of devices) to a second group of memories (a second group of devices) according to a predetermined rule; 2 and 3, data input lines for inputting data from two memories in the first memory group; 4 and 5, data output lines for outputting data to two memories in the second memory group; 6, a data switch which changes over the conditions of connection between the data input lines 2, 3 and the data output lines 4, 5; 11, a group of counters which are provided to correspond to a plurality of different kinds of data to count and store a cumulative number of data outputted from the data output lines 4 and 5 of the coupling unit 1 for each kind of data; and 12, a control circuit which controls the counter group 11, judges whether or not there is any deviation in the distribution of data which are transferred from the first memory group to the second memory group on the basis of the contents of the counter group 11 and changes over the connection patterns of the data switch 6 in the coupling unit 1 so that any such deviation is corrected thereby enabling equal distribution of data to the second memory group. The control circuit 12 in this embodiment controls the counters 11 and changes over the connection patterns of the data switch 6 on the basis of the counts of the counters 11. It should be noted that the general arrangement of the data distributing apparatus in accordance with this embodiment is the same as that shown in FIG. 4 except for the data distribution controller, and description thereof is therefore omitted.

The operation will next be explained. In advance of the data distribution, all the counters 11 in each coupling unit 1 are initialized to 0. These counters 11 are controlled by the control circuit 12 such that, when a piece of data of X-th ($X = 0, \ldots, K-1$) kind is outputted from the data output line 4, "1" is added to the X-th counter in the counter group 11, whereas, a piece of data of the same kind is outputted from the data output line 5, "1" is subtracted from the X-th counter in the counter group 11. More specifically, if the count of the X-th counter in the counter group 11 is positive at a certain point of time, it means that the majority of the data of the X-th kind outputted from this coupling unit 1 up to that time were delivered through the data output line 4. Similarly, if the count is zero, it means that half of the number of data of the X-th kind outputted from this coupling unit 1 up to that time were delivered through the data output line 4, and the second half of the data were delivered through the data output line 5. If the count is negative, it means that the majority of the data were delivered through the data output line 5. In the example shown in FIG. 1, the counts of the counters 11 are "1", "5", "0" and "−2", respectively, which indicate that the number of data of the 0-th kind that were delivered to the data output line 4 is greater than that to the data output line 5 by one; the number of data of the first kind that were delivered to the data output line 4 is greater than that to the data output line 5 by five; the number of data of the second kind that were delivered to the data output line 4 is equal to that to the data output line 5; and the number of data of the third kind that were delivered to the data output line 4 is smaller than that delivered to the data output line 5 by two.

Thus, it is possible by means of the counters 11 to control the condition of local distribution of data delivered through the two output lines 4 and 5 of the coupling unit 1 concerned for each kind of data. It is necessary in order to realize equal distribution of data for each kind, which is the object of the present invention, to output the same number of data for each kind to each of the output lines 4 and 5 in each coupling unit 1, which is equivalent to the fact that the counts of all the counters 11 in each coupling unit 1 are 0 at the time of completion of the data distribution.

As to data that is inputted through the data input line 2 or 3, when the definition of kinds of data can be readily made, it is possible to obtain the kind of data to which the input data belongs from the data itself. For example, if eight different kinds of data are defined by using three low-order bits in the bit expression of data as a kind identifier, the coupling unit itself can identify the kind of data by extracting three low-order bits. When the definition of kinds of data is complicated, it is possible to identify the kind of each piece of data, for example, by arithmetically obtaining the kind of data immediately before the data is delivered from the first memory group 8, adding such information to the top of the data, and referring to the top of the data in the coupling unit 1.

Figure 2:
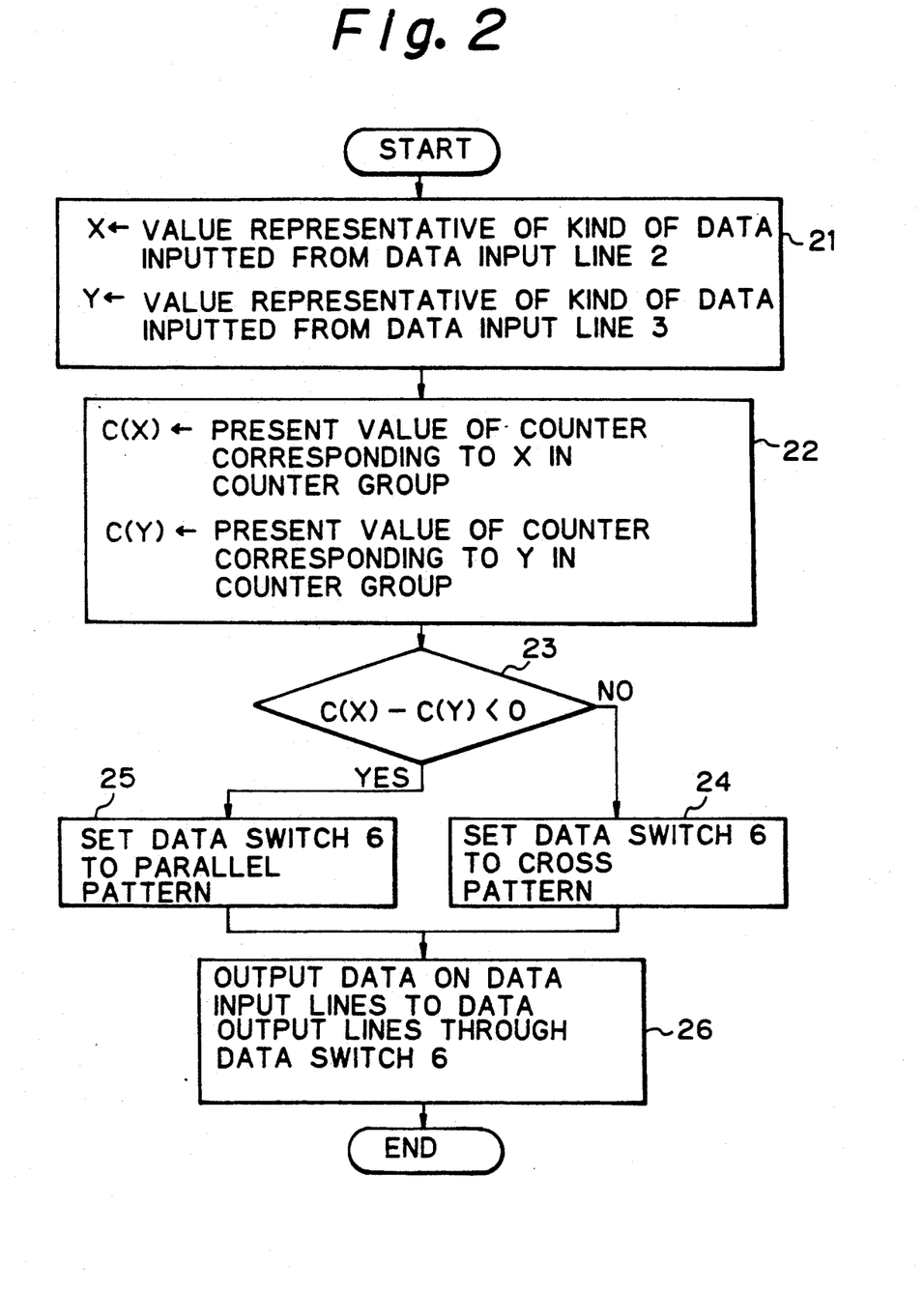
FIG. 2 is a flowchart showing one embodiment of the data distributing method according to the present invention.

The operation of the coupling unit 1 will be further explained below with reference to FIG. 2.

When data distribution is started under the control of the distribution control circuits 12, data is successively delivered from the first memory group 8 to the data input lines 2 and 3 of the coupling units 1 in the first row. The distribution control circuit 12 of each coupling unit 1 in the first row recognizes the kinds X and Y of data that are sent to the data input lines 2 and 3 from the corresponding memories in the first memory group 8 (Step 21 in FIG. 2), and obtains a difference between the counts C(X) and C(Y) of the counters 11 that correspond to the kinds X and Y of the input data (Steps 22 and 23 in FIG. 2). If the resulting difference is either positive or zero, the control circuit 12 connects the data input lines 2 and 3 to the data output lines 5 and 4, respectively (i.e., the cross pattern; Step 24 in FIG. 2), whereas, if the resulting difference is negative, the control circuit 12 determines a connection pattern for the data switch 6 so that the data input lines 2 and 4 are connected to the data output lines 4 and 5, respectively (i.e., the parallel pattern; Step 25 in FIG. 2). Thus, the data sent through the data input lines 2 and 3 are delivered to the data output lines 4 and 5 according to the connection pattern of the data switch 6 determined in this way (Step 26 in FIG. 2) and further delivered to the coupling units 1 in the second row which are connected to these data output lines 4 and 5.

For example, it is assumed that data which belongs to the first kind is inputted through the data input line 2 and data which belongs to the third is inputted through the data input line 3 and that the counts of the counters 11 corresponding to these two kinds of data are "5" and "−2", respectively. This means that the number of data of the first kind inputted to the coupling unit 1 and outputted to the data output line 4 up to that time is greater than that to the data output line 5 by five, and similarly, the number of data of the third kind outputted to the data output line 4 up to that time is smaller than that to the data output line 5 by two. In this case, therefore, the data of the first kind should be outputted to the data output line 5, and the data of the third kind to the data output line 4. By doing so, the counts of the two counters 11 become "4" and "−1", respectively, thus approaching "0". According to the above-described method, the difference of the counts of the two counters 11 is positive, i.e., $5-(-2)=7$. In this case, therefore, the data input lines 2 and 3 are connected to the data output lines 5 and 4, respectively, by the data switch 6 (i.e., the cross pattern), thus realizing equal distribution of data.

In the above-described case, when two different kinds of data are inputted, the number of data of one kind out-putted to the data output line 4 up to that time is greater than that to the data output line 5, whereas, the number of data of another kind outputted to the data output line 4 up to that time is smaller than that to the data output line 5. Let us consider another possible case where, with regard to two different kinds of input data, the number of data outputted to one of the two data output lines 4 and 5 up to that time is greater than that to the other.

For example, it is assumed that data which belongs to the 0-th kind is inputted through the data input line 2 and data which belongs to the first kind is inputted through the data input line 3 and that the counts of the counters 11 corresponding to these two kinds of data are "1" and "5", respectively. This means that the number of data of the 0-th kind inputted to the coupling unit 1 and outputted to the data output line 4 up to that time is greater than that to the data output line 5 by one, and the number of data of the first kind outputted to the data output line 4 up to that time is also greater than that to the data output line 5 by five. In other words, there is a deviation in the distribution of data, that is, the distribution of data of the first kind has been made disproportionately with respect to the distribution of data of the 0-th kind. Accordingly, in this case it is preferable to connect the data input lines 2 and 3 to the data output lines 4 and 5, respectively, with a view to reducing the disproportionate distribution of data of the first kind. According to the above-described method, the difference between the counts of the two counters 11 is negative, i.e., $1-5=-4$, so that the connection pattern (parallel pattern) is selected for the data switch 6. Thus, an effective connection pattern is selected.

Let us confirm that this embodiment realizes equal distribution of data for all possible cases. Assuming that the kind of data inputted from the data input line 2 is X and the kind of data inputted from the data input line 3 is Y and the present counts of the counters 11 corresponding to the kinds X and Y are $C(X)$ and $C(Y)$, respectively, all the possible cases are as follows:

(a) A case where the majority of the data of the kind X have been sent to the data output line 4, and the majority of the data of the kind Y have also been sent to the output line 4: $C(X) \geq 0$ and $C(Y) \geq 0$.

(b) A case where the majority of the data of the kind X have been sent to the data output line 4, and the majority of the data of the kind Y have been sent to the output line 5: $C(X) \geq 0$ and $C(Y) < 0$.

(c) A case where the majority of the data of the kind X have been sent to the data output line 5, and the majority of the data of the kind Y have been sent to the output line 4: $C(X) < 0$ and $C(Y) \geq 0$.

(d) A case where the majority of the data of the kind X have been sent to the data output line 5, and the majority of the data of the kind Y have also been sent to the output line 5: $C(X) < 0$ and $C(Y) < 0$.

In the case (b), with regard to the kind X of data, the majority of the data have been sent to the data output line 4, and with regard to the kind Y of data, the majority of the data have been sent to the output line 5; therefore, the data of the kind X should be delivered to the data output line 5 to correct the disproportionate condition, and similarly, the data of the kind Y should be delivered to the data output line 4 to correct the disproportionate condition. More specifically, the counts of the counters 11 that result from this operation are $C(X)-1$ and $C(Y)+1$, respectively, and since $C(X)$ is a positive value and $C(Y)$ is a negative value, the counts of the two counters 11 approach zero.

In the case (c), the data of the kind X is delivered to the data output line 4, and the data of the kind Y to the data output line 5, whereby the disproportionate condition is similarly corrected. More specifically, the counts of the counters 11 that result from this operation are $C(X)+1$ and $C(Y)-1$, respectively, and since $C(X)$ is a negative value and $C(Y)$ is a positive value, the counts of the two counters 11 approach zero.

In the case (a), data have been disproportionately transferred to the output line 4 with regard to both the two kinds of data. In this case, therefore, the data should be transferred in such a manner as not to further increase the degree of disproportion of the distribution of data of one of the two kinds which has a higher degree of disproportion. More specifically, the data of the kind that has a lower degree of disproportion is delivered to the data output line 4, while the data of the kind that has a higher degree of disproportion is delivered to the data output line 5. If $C(X) < C(Y)$, for example, the kind X has a lower degree of disproportion; therefore, this constitutes an effective way to deliver data of the kind X to the data output line 4 and data of the kind Y to the data output line 5. The counts of the counters 11 that result from this operation are $C(X)+1$ and $C(Y)-1$, respectively. Thus, although $C(X)$ increases, $C(Y)$ decreases, so that the condition of distribution of data of the kind that has a higher degree of disproportion approaches an equal distribution condition. In the entire distribution process, the situation of b. or c. occurs many times thereafter, so that the counts of these counters 11 further approach zero.

In the case (d) also, the same processing as in the case (c) should be executed. More specifically, if $C(X) > C(Y)$, the kind X of data is lower in the degree of disproportion (in this case, both $C(X)$ and $C(Y)$ are negative and the absolute value of the kind X is smaller); therefore, this constitutes an effective way to deliver the data of the kind X to the data output line 4 and the data of the kind Y to the data output line 5. The counts of the counters 11 that result from this operation are $C(X)+1$ and $C(Y)-1$, respectively. Although $C(X)$ increases, $C(Y)$ decreases, so that the condition of distribution of data of the kind that is higher in the degree of disproportion approaches an equal distribution condition. In the entire distribution process, the situation of b. or c. occurs many times thereafter, so that the counts of these counters 11 further approach zero.

In the foregoing, if $C(X) = C(Y)$, either of the two may be selected. In this embodiment, however, the same operation as in the case where the counts are positive is applied to this case.

The foregoing description is summarized as follows:
(a) In a case where the majority of the data of the kind X have been sent to the data output line 4, and the majority of the data of the kind Y have also been sent to the output line 4: $C(X) \geq 0$ and $C(Y) \geq 0$

| | |
|---|---|
| if $C(X) < C(Y)$, | the input line 2(X) → the output line 4 |
| | the input line 2(Y) → the output line 5 |
| if $C(X) \geq C(Y)$, | the input line 2(X) → the output line 5 |
| | the input line 2(Y) → the output line 4 |

(b) In a case where the majority of the data of the kind X have been sent to the data output line 4, and the majority of the data of the kind Y have been sent to the output line 5: $C(X) \geq 0$ and $C(Y) < 0$ the input line 2(X)→the output line 5 the input line 2(Y)→the output line 4

(c) In a case where the majority of the data of the kind X have been sent to the data output line 5, and the majority of the data of the kind Y have been sent to the output line 4: $C(X) < 0$ and $C(Y) \geq 0$ the input line 2(X)→the output line 4 the input line 2(Y)→the output line 5

(d) In a case where the majority of the data of the kind X have been sent to the data output line 5, and the majority of the data of the kind Y have also been sent to the output line 5: $C(X) < 0$ and $C(Y) < 0$

| | |
|---|---|
| if $C(X) \geq C(Y)$, | the input line 2(X) → the output line 4 |
| | the input line 2(Y) → the output line 5 |
| if $C(X) < C(Y)$, | the input line 2(X) → the output line 5 |
| | the input line 2(Y) → the output line 4 |

The foregoing may be rearranged as follows:
(a) In a case where the majority of the data of the kind X have been sent to the data output line 4, and the majority of the data of the kind Y have also been sent to the output line 4: $C(X) \geq 0$ and $C(Y) \geq 0$ if $C(X) - C(Y) < 0$, the parallel pattern is selected; and if $C(X) - C(Y) \geq 0$, the cross pattern is selected.
(b) In a case where the majority of the data of the kind X have been sent to the data output line 4, and the majority of the data of the kind Y have been sent to the output line 5: $C(X) \geq 0$ and $C(Y) < 0$ in this case, the condition of $C(X) - C(Y) \geq 0$ always holds, and the cross pattern is selected.
(c) In a case where the majority of the data of the kind X have been sent to the data output line 5, and the majority of the data of the kind Y have been sent to the output line 4: $C(X) < 0$ and $C(Y) \geq 0$ in this case, the condition of $C(X) - C(Y) < 0$ always holds, and the parallel pattern is selected.
(d) In a case where the majority of the data of the kind X have been sent to the data output line 5, and the majority of the data of the kind Y have also been sent to the output line 5: $C(X) < 0$ and $C(Y) < 0$ if $C(X) - C(Y) \geq 0$, the cross pattern is selected; and if $C(X) - C(Y) < 0$, the parallel pattern is selected.

To sum up, it will be understood that, in any case, if $C(X) - C(Y) > 0$, the cross connection pattern that the input lines 2(X) and 3(Y) are connected to the output lines 5 and 4, respectively, should be selected, whereas, if $C(X) - C(Y) < 0$, the parallel connection pattern that the input lines 2(X) and 2(Y) are connected to the output lines 4 and 5, respectively, should be selected. Accordingly, this embodiment enables effective control to achieve equal distribution of data for each kind in any possible case.

The coupling units 1 in the second row and those in the following rows repeat a similar operation. Data that is outputted through either the output line 4 or 5 of each coupling unit 1 which belongs to the final row is stored in the corresponding memory in the second memory group 9 while being arranged according to kind.

Thus, according to the foregoing embodiment, each coupling unit is provided with a counter for each of K different kinds of data to judge whether or not there is a deviation of the distribution of data in the second group of memories, which are destinations of data transfer, on the basis of whether the count of each counter is positive or negative, and changes over the connection patterns of the data switch so that any deviation is corrected. Thus, each coupling unit is capable of data distribution processing without the need to receive an instruction from a data distribution controller as in the prior art. Accordingly, data distribution control is individually effected in each coupling unit, and no data distribution controller is needed. Thus, the product cost of the data distributing apparatus is lowered and the efficiency of the data distribution processing is increased. In addition, it is possible to effect data distribution processing without causing a deterioration in the performance even when the number of memories in the first and second memory groups and the number of coupling units increase.

Although in the foregoing embodiment the object of distribution is data, it should be noted that the present invention is not necessarily limitative to the distribution of data and that work units (jobs, job steps, etc.) may be employed as an object of distribution. In such a case, in a computer system for jobs, job steps, etc., the devices in the first device group may be arranged as work unit input devices, and the devices in the second device group as work unit processors.

As has been described above, according to the present invention, a cumulative number of data or work units outputted from each coupling unit is stored for each kind of data or work unit in one of the counters, which are provided to correspond to a plurality of different kinds of data or work unit, and a control circuit judges whether or not there is any deviation in the distribution of data or work units transferred on the basis of the contents of the counters and changes over the connection patterns of the data switch so that any deviation is corrected. Accordingly, data or work unit distribution control is individually effected in each coupling unit, and it becomes unnecessary to provide a data distribution controller such as that needed in the prior art. Thus, the product cost of the data distributing apparatus is lowered and the efficiency of the data or work unit distribution processing is increased. In addition, it is possible to effect data or work unit distribution processing without causing a deterioration in the performance even when the number of devices in the first and second device groups and the number of coupling units increase.

What is claimed is:

1. A data distributing apparatus having a plurality of coupling units which are provided between a first group of devices and a second group of devices to distribute equally a number of different kinds of information received from said first group of devices to said second group of devices, wherein each of said coupling units comprises:

a data switch having a plurality of data input lines for receiving pieces of information and a plurality of data output lines for outputting pieces of information;

a number of counters corresponding to the number of different kinds of information, each counter monitoring the received pieces of information, and counting and storing a count which indicates a distribution of pieces of information outputted from said coupling unit for each kind of information; and a control circuit which detects a deviation in the equal distribution of information transferred from said first device group to said second device group on the basis of counts stored in said counters, changes how data is coupled from the data input lines to the data output lines so that the deviation is corrected, and distributes information to said second group of devices.

2. A data distributing apparatus having a plurality of coupling units which are provided between a first group of devices and a second group of devices to equally distribute data from said first group of devices to said second group of devices according to a predetermined rule, each of said coupling units comprising:

a plurality of counters corresponding to a plurality of different kinds of data; and a control circuit which controls said counters and changes a data connection pattern on the basis of the contents of said counters, each of said counters counting and storing a count which indicates a distribution of data outputted from said coupling unit for each kind of data, said control circuit being arranged to determine whether or not there is a deviation in the equal distribution of data transferred from said first device group to said second device group on the basis of the contents of said counters, to change the data connection pattern in said coupling unit so that the deviation is corrected, and to distribute data to said second group of devices.

3. In a data distributing apparatus having a plurality of coupling units which are provided between a first group of devices and a second group of devices, each coupling unit having a data switch which has two data input lines for receiving two pieces of information and two data output lines for outputting two pieces of information, a method for equally distributing a plurality of pieces of information received from said first group of devices to said second group of devices for each kind of information, said method comprising the steps of:

determining the kinds of said two pieces of information received;

storing the difference between numbers of pieces of information outputted from said two output lines, respectively, for each kind of information;

calculating the difference between the stored differences concerning said two pieces of information received; and changing a connection pattern in said data switch on the basis of said differences.

4. A data distributing method according to claim 3, wherein said step of counting and storing the difference between numbers of pieces of information outputted from said two output lines, respectively, for each kind of information comprises:

incrementing, when a piece of information of a certain kind is outputted to said first output line, the counter for this kind of information by one; and decrementing said counter by one when said piece of information is outputted to said second output line;

said step of calculating the difference between the stored values concerning said two pieces of information received including substracting the value stored in the counter corresponding to the kind of information piece inputted to said second input line from the value stored in the counter corresponding to the kind of information piece inputted to said first input line; and said step of changning over connection patterns in said data switch on the basis of said difference value effects control so that, if said difference calculated is negative, said first input line is connected to said second output line and, at the same time, said second input line is connected to said first output line, and if said difference calculated is either positive or zero, said first input line is connected to said first output line and, at the same time, said second input line is connected to said second output line.

* * * * *